(12) United States Patent
DiMeo et al.

(10) Patent No.: US 6,640,328 B1
(45) Date of Patent: Oct. 28, 2003

(54) METHOD FOR DETECTING DROPOUTS IN DATA DELIVERED OVER A BANDWIDTH-LIMITED BUS

(75) Inventors: Matthew J. DiMeo, San Diego, CA (US); John M. Brooks, San Diego, CA (US); Steven S. Mair, San Diego, CA (US); Daniel A. Marotta, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/158,802

(22) Filed: Sep. 22, 1998

(51) Int. Cl.[7] .............................. G06K 5/00; H03K 3/84; H04N 5/94
(52) U.S. Cl. ............................ 714/818; 386/47; 327/18
(58) Field of Search ........................ 700/94; 714/43–44, 714/54, 48, 718–720, 799, 818, 821, 712; 386/47; 327/18

(56) References Cited

U.S. PATENT DOCUMENTS

| | | | | | |
|---|---|---|---|---|---|
| 4,680,647 | A | * | 7/1987 | Moriyama | 386/112 |
| 4,860,121 | A | * | 8/1989 | Gotoh | 386/51 |
| 4,937,686 | A | * | 6/1990 | Arai et al. | 360/32 |
| 5,627,846 | A | * | 5/1997 | Carr | 360/46 |
| 5,677,752 | A | * | 10/1997 | Miyamori et al. | 352/11 |
| 6,002,724 | A | * | 12/1999 | Kaku et al. | 375/326 |
| 6,044,338 | A | * | 3/2000 | Akune | 386/47 |
| 6,151,634 | A | * | 11/2000 | Glaser et al. | 709/236 |

* cited by examiner

Primary Examiner—Christine T. Tu
Assistant Examiner—Esaw Abraham
(74) Attorney, Agent, or Firm—Procopio, Cory, Hargreaves & Savitch, LLP

(57) ABSTRACT

A method for detecting dropouts in digital data transferred over a bus from a digital data source to a computer system. Each address in the computer system buffer memory is initialized to a selected code value known not to exist in the data to be transferred. After sequential transfer of data to the buffer memory, the presence of the selected code value in the buffer memory indicates that a dropout occured.

31 Claims, 3 Drawing Sheets

| Address | Value |
|---|---|
| 0 | 8000hex |
| 1 | 8000hex |
| 2 | 8000hex |
| 3 | 8000hex |
| 4 | 8000hex |
| 5 | 8000hex |
| 6 | 8000hex |
| 7 | 8000hex |

FIG. 3a

| Address | Value |
|---|---|
| 0 | 0231hex |
| 1 | 0233hex |
| 2 | 0234hex |
| 3 | 0333hex |
| 4 | 0321hex |
| 5 | 0234hex |
| 6 | 1234hex |
| 7 | 1368hex |

FIG. 3b

| Address | Value |
|---|---|
| 0 | 0231hex |
| 1 | 0233hex |
| 2 | 8000hex |
| 3 | 8000hex |
| 4 | 0321hex |
| 5 | 0234hex |
| 6 | 1234hex |
| 7 | 1368hex |

FIG. 3c

METHOD FOR DETECTING DROPOUTS IN DATA DELIVERED OVER A BANDWIDTH-LIMITED BUS

TECHNICAL FIELD

This invention relates to electronic systems, and more particularly to a method and system for detecting dropouts in data delivered over a bandwidth-limited bus from a source of digital data to a computer system.

BACKGROUND

"Video capture" involves a process of extracting digitized audio/video information from a video image stream comprising a sequence of electronically-encoded image frames with accompanying sound. The audio/video source be a signal conforming to one of the well-known NTSC, PAL, or SECAM standards, or a video camera, or recorded audio/video signals played on a video cassette recorder (VCR) or the like. The target output system may be, for example, a personal computer system.

For example, FIG. 1 is a block diagram of a prior art electronic video decoder system 1 and computer system 2. Any of several video sources, such as a video camera 3, VCR 4, or a television antenna or cable signal source 5 processed through an RF tuner 5a, are coupled to the video decoder system 1, which may be, for example, a Rockwell Semiconductor Systems Bt848A single-chip video capture processor and PCI Bus Master, available from Rockwell Semiconductor Systems, Newport Beach, Calif. The video decoder system 1 can place video data directly into the system memory 6 of the computer system 2. The computer system 2 includes the system memory 6, a central processing unit 7, and a host bridge 8 to couple the computer system to a conventional high-speed bus 9, such as the PCI Bus. The video decoder system 1 can also provide video data to a computer graphics adapter 10, which includes a graphics controller 11, a frame buffer 12, and a RAMDAC 13. The output of the video decoder system 1 is placed into a target area in the frame buffer 12 for video overlay applications, so that a video image stream may be displayed on a monitor 14.

The video decoder system 1 includes a video decoder module 20 for converting the input video signal to a decoded digital format. The video decoder module 20 may include an analog-to-digital converter (ADC) and other video processing circuitry, as known in the art. This digital video information is temporarily stored in a first-in-first-out (FIFO) memory 22. A PCI Bus Master circuit 23 provides controlled transfer of digitized data from the FIFO memory 22 over the bus 9 to the system memory 6 of the computer system 2.

Audio data from certain signal sources is processed by a separate audio decoder circuit 27, which generates an analog signal to an audio subsystem 28 of the computer system 2 for playback through a speaker system 29.

The inventors have determined that it would be useful to use the processing capabilities of the computer system 2 to decode an audio signal within a video decoder system, thus obviating the need for a separate audio decoder circuit and analog cabling to the audio subsystem. This capability would require that an input audio signal be digitized by an ADC, stored in a portion of the FIFO memory 22 (or a separate FIFO memory), and be transferred over the bus 9 to the system memory 6 of the computer system 2 in a steady stream. However, a problem with bus-mastering decoders is that the bandwidth of the bus 9, particularly the well-known PCI bus, is limited. Under congested conditions, this bandwidth limitation can lead to a certain number of dropouts when delivering data at high-speed from a FIFO memory to the system memory 6. Dropouts are caused when the FIFO memory overruns due to insufficiently frequent PCI bus accesses. More particularly, during a data transfer from the FIFO memory over the bus 9 to the system memory 6, a write pointer within the video decoder system 1 begins incrementing, providing an address for the system memory 6 into which to write the data. Incrementation of the write pointer is ostensibly in lock-step with the writing of the data into the system memory 6 via a fast direct memory access (DMA) operation. However, if a dropout occurs due to lack of a bus access, the data is never written into the system memory 6. Such dropouts are not too objectionable in video-in-a-window applications (where the eye tends to integrate out instantaneous blips), but they can cause major audible clicks and pops when audio data is being transmitted. Design of a solution is complicated by the fact that there can be no guarantee that any data placed in a FIFO memory will actually be delivered to system memory 6.

The inventors have determined that there is a need for a method for detecting dropouts in digital data delivered over a bandwidth-limited bus from a source of digital data to a computer system. The present invention provides a method and system for achieving this end.

SUMMARY

The invention provides a method and system for detecting dropouts in digital data transferred over a bandwidth-limited bus from a source of digital data to a computer system. Within the digital data source, audio data is sampled and monitored to replace every instance of a selected code value with a nearby code value in order to preserve one code value as an "illegal" code. The data is then placed in an internal buffer memory. During an initialization procedure within the computer system, before any transfer from the digital data source buffer memory to the system memory, the contents of all memory addresses into which audio data is to be written are first preset to the selected "illegal" code value. Thereafter, the digital data source attempts to write data from its buffer memory over the bus into the audio data buffer. Normally, a sequential set of addresses in the audio data buffer will be accessed for writing audio data values. If a dropout does not occur, all of the preset data values will be overwritten with valid data. However, if a dropout over the bus occurs, the digital data source continues to increment its write pointer, thus increasing the address count. After the cause of the dropout terminates, data again flows from the buffer memory over the bus into the audio data buffer. However, because the write pointer has incremented its address count, the next location to which audio data is written is not contiguous to the last written location. In between the next location and the last written location are one or more memory locations that have a value equal to the selected "illegal" code value. Thus, a dropout has the effect of failing to overwrite whatever data happened to be in the buffer before writing recommences. Such illegal code values may be detected after the digital data source is done filling the audio data buffer in the system memory.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3a is a diagram of an audio data buffer preset to a selected value.

FIG. 3b is a diagram of an audio data buffer into which audio data has been transferred without a dropout.

FIG. 3c is a diagram of an audio data buffer into which audio data has been transferred with a dropout.

Like reference numbers and designations in the various drawings indicate like elements.

DETAILED DESCRIPTION

The invention provides a method and system for detecting dropouts in digital data transferred over a bandwidth-limited bus from a source of digital data to a computer system. Since significant audio "clicking" and "popping" would be unacceptable to end-users, a method needed to be found which would allow the detection of a dropout condition in a timely fashion. This would allow steps to be taken to minimize the impact of the dropout on the perceived audio quality.

For purposes of illustration, the source of the digital audio data will be considered to come from an audio/video decoder system. However, the digital audio data source may be any system in which digital audio data is to be transferred over a bandwidth-limited bus to a computer system.

Figure 1:
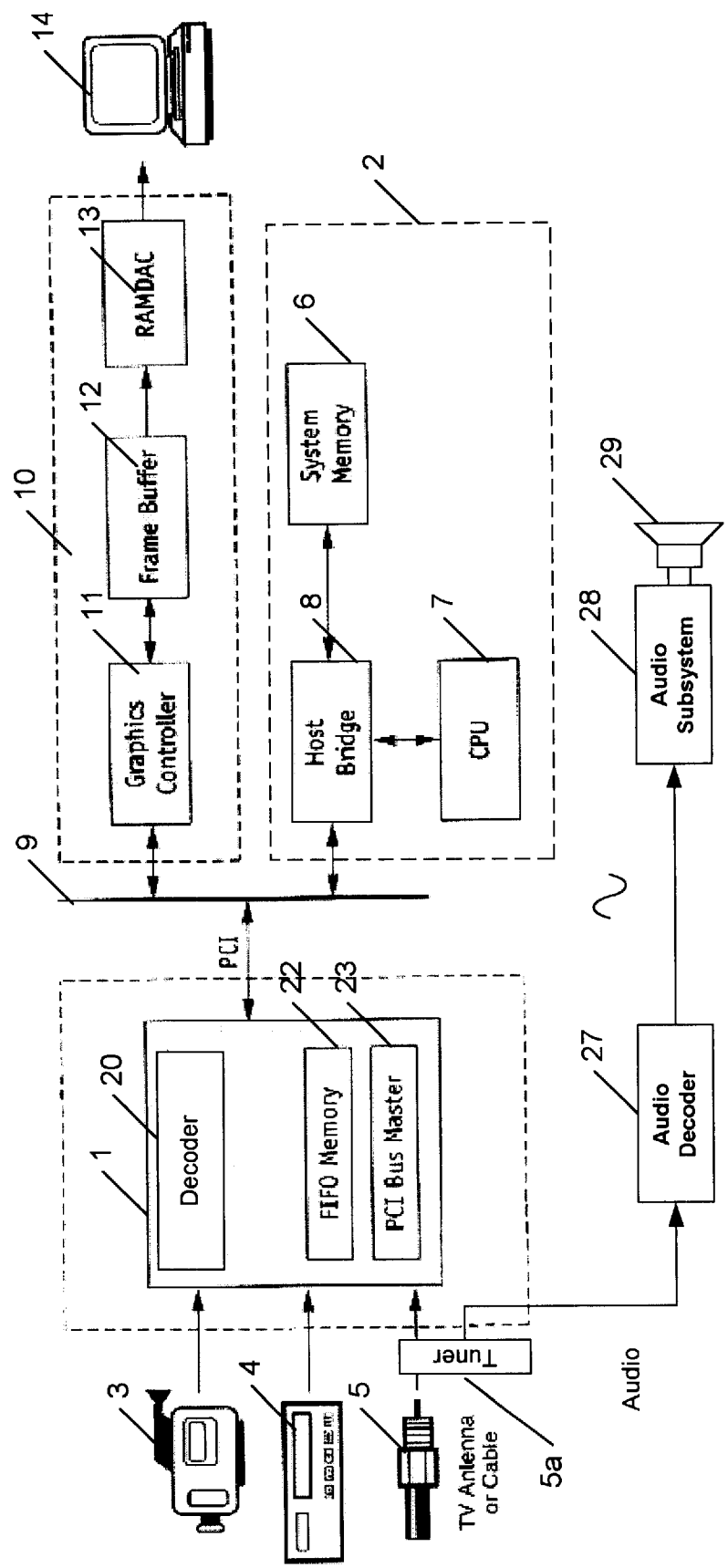
FIG. 1 is a block diagram of a prior art electronic video decoder system and computer system.
Figure 2:
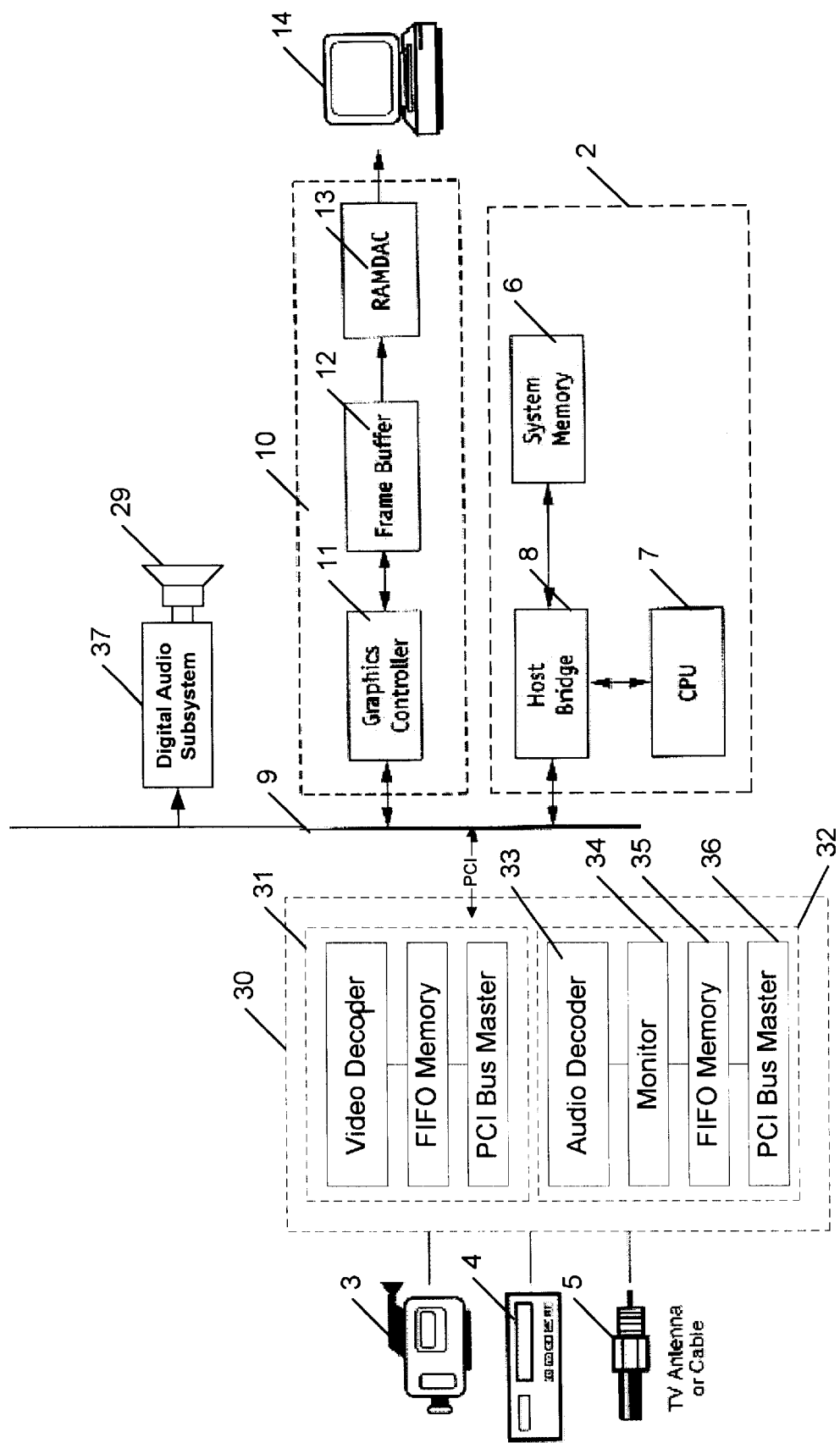
FIG. 2 is a block diagram of a modified electronic video decoder system in accordance with the invention.

FIG. 2 is a block diagram of an electronic audio/video decoder system 30 in accordance with the invention. The decoder system 30 is similar to the system shown in FIG. 1, in that it includes a complete video decoder system 31. However, the decoder system 30 also includes an audio decoder system 32. The audio decoder system 32 includes an audio decoder 33 for decoding and digitizing an input audio signal (the audio decoder 33 may include an ADC and other audio processing circuitry, as known in the art); a monitor circuit 34; a FIFO memory 35; and a PCI Bus Master circuit 36 that provides controlled transfer of digitized data from the FIFO memory 35 over the bus 9 to the system memory 6 of the computer system 2.

After audio data is sampled by the audio decoder 33, the monitor circuit 34 "traps" the audio data values and replaces every instance of a selected code value with a nearby code value in order to preserve one code value as an "illegal" code. The data is then placed in the FIFO memory 33.

For example, assume the range of data values that could be output by the audio decoder 33 ranges from a maximum positive value of 7FFF hex to a maximum negative value of 8000 hex (i.e., a two's complement numbering scheme). The monitor circuit 34 can then be configured to detect and replace each occurrence of a selected value (e.g., 8000 hex) with an adjacent substitute value (e.g., 8001 hex). The substitute value should be selected so that there would be essentially no audible difference between the substitute value and the original selected value, thus minimizing loss of range and accuracy. In the preferred embodiment, the selected value (8000 hex in this example) should never be a "legal" code that could be found in the FIFO memory 35. Of course, other values may be chosen for the selected "illegal" code value and the substitute code value. However, there is one more negative value than positive value in the two's complement binary numbering scheme, and the maximum negative value for a particular system rarely occurs naturally. Hence, the maximum negative value for a particular system is particularly useful as the selected "illegal" code value.

The audio decoder system 32 attempts to write the contents of the audio data in the FIFO memory 35 into the system memory 6 over the bus 9. However, the addition of the monitor circuit 34 to the audio decoder system 32 provides the ability to detect dropouts within the computer system 2.

More particularly, a further part of the invention involves processing performed within the computer system 2. During an initialization procedure before a DMA transfer of audio data from the FIFO memory 35 to the system memory 6, the contents of all memory addresses into which audio data is to be written are first preset to the selected "illegal" code value. Thus, for example, if the selected "illegal" code value is 8000 hex, that value is written into every location of an audio data buffer within the system memory 6. FIG. 3a is a diagram of an audio data buffer preset to a selected value. Thereafter, the audio decoder system 32 attempts to write data from its FIFO memory 35 over the bus 9 into the audio data buffer. Normally, a sequential set of addresses in the audio data buffer will be accessed for writing audio data values. If a dropout does not occur, all of the preset data values will be overwritten with valid data. FIG. 3b is a diagram of an audio data buffer into which audio data has been transferred without a dropout. Appropriate programming of the CPU 7 can then decode the audio data and transfer the decoded data over the bus 9 to a digital audio subsystem 37 for playback.

However, if a dropout over the bus 9 occurs, the audio decoder system 32 continues to increment its write pointer, thus increasing the address count. After the cause of the dropout terminates, data again flows from the FIFO memory 35 over the bus 9 into the audio data buffer. However, because the write pointer has incremented its address count, the next location to which audio data is written is not contiguous to the last written location. In between the next location and the last written location are one or more memory locations that have a value equal to the selected "illegal" code value (8000 hex in this example). Thus, a dropout has the effect of failing to overwrite whatever data happened to be in the buffer before writing recommences. FIG. 3c is a diagram of an audio data buffer into which audio data has been transferred with a dropout. Addresses "2" and "3" have the original selected "illegal" code value, indicating the location and duration of the dropout.

The audio decoder system 32 generates an interrupt to the computer system 2 when the audio decoder system 32 is done filling the audio data buffer in the system memory 6. In the preferred embodiment, a computer program executing in the computer system 2 simply checks the contents of each address location in the audio data buffer for the selected illegal code. The presence of the selected illegal code would indicate a dropout, since the preset data contents were not overwritten. Thereafter, the CPU 7 can be appropriately programmed to perform any of several actions, depending on the desires of the system developer. By way of example only, the CPU 7 could interpolate data values for the dropout period from the bracketing good data values, thus reducing audible "clicking" and "popping".

In an alternative embodiment, the initialization value for the memory addresses into which audio data is to be written may be any "legal" value that is known not to exist within a particular block of data. This may be determined, for example, by using the monitor circuit 34 to track the range of values within a block of any desired size, and selecting a value not included within that range. This "dynamic" initialization code value for a particular block of data can be communicated to the computer system 2 and used to initialize the contents of all memory addresses into which audio data is to be written. Thus, in this embodiment, no actual code substitution need occur.

The invention has several advantages over other techniques. It allows 100% reliable detection of dropouts. When not being used, implementations of the invention cause no decrease in performance or quality. The preferred embodiment of the invention has considerably less performance overhead than interrupt-driven schemes, and it can detect the exact location of dropouts of a single sample or more.

Computer Implementation

Aspects of the invention may be implemented in hardware or software, or a combination of both. However, preferably, the algorithms and processes of the invention are implemented in one or more computer programs executing on programmable computers each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CD-ROM, tape, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Neverthe-less, it will be understood that various modifications may be made without departing from the spirit and scope of the invention. For example, the same technique may be applied to video data. As another example, the processed data need not be temporarily stored in a FIFO memory, but may be streamed out of the respective decoder. Further, the bus may be any bus (e.g., USB, IEEE1394, etc.) having dropout characteristics which can be detected by the present invention. Accordingly, other embodiments are within the scope of the following claims.

What is claimed is:

1. A method for detecting dropouts in digital data transferred over a bus from a digital data source to a computer system, including the steps of:
   (a) initializing each address location in a buffer memory within the computer system to a selected code value known not to exist within data generated within the digital data source;
   (b) initiating a transfer of such data over the bus to sequential locations within the buffer memory;
   (c) indicating if a dropout occurred during such transfer upon detection of the presence of the selected code value within the buffer memory.

2. The method of claim 1, wherein the data generated within the digital data source is audio data.

3. The method of claim 1, wherein the bus is a PCI bus.

4. A method for detecting dropouts in digital data transferred over a bus from a digital data source to a computer system, including the steps of:
   (a) monitoring data generated within the digital data source for occurrences of a selected code value;
   (b) replacing each occurrence of the selected code value with a substitute code value;
   (c) initializing each address location in a buffer memory within the computer system to the selected code value;
   (d) initiating a transfer of the data over the bus to sequential locations within the buffer memory;
   (e) indicating if a dropout occurred during such transfer upon detection of the presence of the selected code value within the buffer memory.

5. The method of claim 4, wherein the data generated within the digital data source is audio data.

6. The method of claim 4, wherein the selected code value is the maximum negative value allowed for the data generated within the digital data source.

7. The method of claim 4, wherein the substitute code value is numerically adjacent to the selected code value.

8. The method of claim 4, wherein the bus is a PCI bus.

9. A system for detecting dropouts in digital data transferred over a bus from a digital data source to a computer system, including:
   (a) a monitoring circuit that monitors a selected portion of data generated within the digital data source for a data value that does not occur with the selected portion of data;
   (b) a communication circuit for transmitting the data value to the computer system as a selected code value;
   (c) a programmed processor configured to receive the selected code value and initialize each address location in a buffer memory within the computer system to the selected code value;
   (d) a data transfer system for initiating a transfer of the data within the data buffer over the bus to sequential locations within the buffer memory;
   (e) a programmed processor for indicating if a dropout occurred during such transfer upon detection of the presence of the selected code value within the buffer memory.

10. The system of claim 9, wherein the data generated within the digital data source is audio data.

11. The system of claim 9, wherein the bus is a PCI bus.

12. A system for detecting dropouts in digital data transferred over a bus from a digital data source to a computer system, including:
   (a) a monitoring circuit that monitors data generated within the digital data source for occurrences of a selected code value, and replaces each such occurrence with a substitute code value;
   (b) a programmed processor for initializing each address location in a buffer memory within the computer system to the selected code value;
   (c) a data transfer system for initiating a transfer of the data over the bus to sequential locations within the buffer memory;
   (d) a programmed processor for indicating if a dropout occurred during such transfer upon detection of the presence of the selected code value within the buffer memory.

13. The system of claim 12, wherein the data generated within the digital data source is audio data.

14. The system of claim 12, wherein the selected code value is the maximum negative value allowed for the data generated within the digital data source.

15. The system of claim 12, wherein the substitute code value is numerically adjacent to the selected code value.

16. The system of claim 12, wherein the bus is a PCI bus.

17. A computer program, residing on a computer-readable medium, for detecting dropouts in digital data transferred over a bus from a digital data source to a computer system, wherein the digital data source monitors a selected portion of data generated within the digital data source for a data value that does not occur with the selected portion of data and communicates the data value to the computer system as a selected code value, the computer program comprising instructions for causing a computer to:

(a) initialize each address location in a buffer memory within the computer system to the selected code value;

(b) indicate if a dropout occurred during a transfer of the data within the internal data buffer over the bus to sequential locations within the buffer memory upon detection of the presence of the selected code value within the buffer memory.

18. The computer program of claim 17, wherein the data generated within the digital data source is audio data.

19. The computer program of claim 17, wherein the bus is a PCI bus.

20. A computer program, residing on a computer-readable medium, for detecting dropouts in digital data transferred over a bus from a digital data source to a computer system, wherein the digital data source monitors data generated within the digital data source for occurrences of a selected code value, replaces each occurrence of the selected code value with a substitute code value, and temporarily stores such data in an internal data buffer, the computer program comprising instructions for causing a computer to:

(a) initialize each address location in a buffer memory within the computer system to the selected code value;

(b) indicate if a dropout occurred during a transfer of the data within the internal data buffer over the bus to sequential locations within the buffer memory upon detection of the presence of the selected code value within the buffer memory.

21. The computer program of claim 20, wherein the data generated within the digital data source is audio data.

22. The computer program of claim 20, wherein the selected code value is the maximum negative value allowed for the data generated within the digital data source.

23. The computer program of claim 20, wherein the substitute code value is numerically adjacent to the selected code value.

24. The computer program of claim 20, wherein the bus is a PCI bus.

25. A method for detecting dropouts in digital data transferred over a bus from a digital data source to a computer system, comprising:

(a) initializing addresses in a buffer memory within the computer system to a selected code value that is expected not to be transferred from the digital data source;

(b) initiating a transfer of digital data from the digital data source to target addresses within the buffer memory; and (c) indicating if a dropout occurred during such transfer upon detecting the selected code value within the buffer memory target addresses.

26. The method of claim 25, wherein step (c) further includes comparing a value stored at each target address to the selected code value after transfer to such address is expected to be complete.

27. The method of claim 25, further comprising (d) replacing each occurrence of the selected code value in the target addresses of the buffer memory with substitute code values.

28. A system for detecting data transfer failures through a data bus, comprising:

a) a monitoring subsystem configured to ensure an absence of a selected code within data units to be transferred from a data source to a data target memory;

b) a data communication system configured to transfer data from the data source to the data target memory; and c) a data transfer failure detection subsystem configured to indicate an occurrence of a data transfer failure, wherein the data transfer failure detection subsystem indicates the occurrence of a data transfer failure by detecting a presence of the selected code within data of the data target memory subsequent to an attempted data transfer.

29. The system of claim 28, wherein the monitoring subsystem is further configured to find examples of the selected code within the data units to be transferred, and to replace each such example with a value other than the selected code.

30. The system of claim 29, further comprising (d) a target data initialization subsystem configured to initialize data target memory to include the selected code value prior to the attempted data transfer.

31. The system of claim 28, further comprising (d) a target data initialization subsystem configured to initialize data target memory to include the selected code value prior to the attempted data transfer.

* * * * *